United States Patent
Chen (10) Patent No.: US 9,189,102 B2
(45) Date of Patent: Nov. 17, 2015

(54) DATA FILTERING METHOD AND ELECTRONIC DEVICE USING THE SAME

(75) Inventor: Hsi-Kun Chen, Taoyuan (TW)

(73) Assignee: 8631654 CANADA INC., Ottawa (CA)

( * ) Notice: Subject to any disclaimer, the term of this patent is extended or adjusted under 35 U.S.C. 154(b) by 1652 days.

(21) Appl. No.: 12/330,551

(22) Filed: Dec. 9, 2008

(65) Prior Publication Data

US 2009/0283338 A1    Nov. 19, 2009

(30) Foreign Application Priority Data

May 16, 2008  (TW) ............................... 97118204 A
May 23, 2008  (CN) ............................ 2008 1 0109133

(51) Int. Cl.
*G06F 3/033* (2013.01)
*G06F 3/041* (2006.01)
*G06F 17/15* (2006.01)

(52) U.S. Cl.
CPC .............. *G06F 3/0418* (2013.01); *G06F 17/15* (2013.01)

(58) Field of Classification Search
CPC ..... G06F 3/033; G06F 3/03547; G06F 3/041; G06F 17/15; G06F 11/3072; G06F 11/3082
USPC .......................... 345/156–179; 702/189–199
See application file for complete search history.

(56) References Cited

U.S. PATENT DOCUMENTS

| | | | |
|---|---|---|---|
| 5,740,064 A * | 4/1998 | Witte et al. ..................... | 702/70 |
| 6,108,800 A * | 8/2000 | Asawa ......................... | 714/47.3 |
| 6,411,278 B1 | 6/2002 | Kage et al. | |
| 6,730,863 B1 | 5/2004 | Gerpheide et al. | |
| 7,333,092 B2 | 2/2008 | Zadesky et al. | |
| 8,013,842 B2 | 9/2011 | Lii et al. | |
| 8,090,535 B2 | 1/2012 | Sato et al. | |
| 8,207,938 B2 * | 6/2012 | Chen ............................ | 345/157 |
| 8,589,461 B1 * | 11/2013 | D'Souza et al. ............. | 708/313 |
| 8,599,164 B2 * | 12/2013 | Chen et al. .................... | 345/174 |

(Continued)

FOREIGN PATENT DOCUMENTS

| | | |
|---|---|---|
| CN | 1901310 | 1/2007 |
| EP | 0 721 169 | 10/1996 |

(Continued)

OTHER PUBLICATIONS

English language translation of abstract of CN 1901310 (published Jan. 24, 2007).

(Continued)

*Primary Examiner* — Alexander Eisen
*Assistant Examiner* — Nelson Lam
(74) *Attorney, Agent, or Firm* — Volpe and Koenig, P.C.

(57) ABSTRACT

A data filtering method includes the following steps. First, m pieces of data are identified at first to $m^{th}$ time points of a plurality of time points, wherein a datum is not identified at an $(m+1)^{th}$ time point of the time points, and m is a positive integer Then, the identified m pieces of data are removed.

5 Claims, 8 Drawing Sheets

(56) References Cited

U.S. PATENT DOCUMENTS

| | | | |
|---|---|---|---|
| 2002/0039092 A1* | 4/2002 | Shigetaka | 345/156 |
| 2002/0171635 A1* | 11/2002 | Takahashi et al. | 345/177 |
| 2003/0088834 A1* | 5/2003 | Murakami et al. | 716/1 |
| 2003/0132922 A1* | 7/2003 | Philipp | 345/173 |
| 2004/0105691 A1* | 6/2004 | Hama et al. | 399/49 |
| 2005/0078020 A1* | 4/2005 | Oizumi et al. | 341/61 |
| 2005/0110768 A1 | 5/2005 | Marriott et al. | |
| 2005/0146511 A1* | 7/2005 | Hill et al. | 345/173 |
| 2005/0200603 A1* | 9/2005 | Casebolt et al. | 345/157 |
| 2005/0209821 A1* | 9/2005 | Nguyen et al. | 702/183 |
| 2008/0048997 A1 | 2/2008 | Gillespie et al. | |
| 2009/0046822 A1* | 2/2009 | Holmberg et al. | 375/373 |
| 2009/0284466 A1* | 11/2009 | Chen | 345/157 |
| 2010/0299075 A1* | 11/2010 | Li et al. | 702/19 |
| 2011/0285619 A1* | 11/2011 | Schifferdecker et al. | 345/156 |

FOREIGN PATENT DOCUMENTS

| | | |
|---|---|---|
| TW | 200634635 | 10/2006 |
| TW | I277721 | 4/2007 |
| TW | I295785 | 4/2008 |

OTHER PUBLICATIONS

Taiwanese language office action dated Jan. 31, 2012.

English language translation of abstract of TW 200634635 (published Oct. 1, 2006).

English language translation of abstract of TW I277721 (published Apr. 1, 2007).

English language translation of abstract of TW I295785 (published Apr. 11, 2008).

\* cited by examiner

DATA FILTERING METHOD AND ELECTRONIC DEVICE USING THE SAME

This application claims the benefit of Taiwan application Serial No. 97118204, filed on May 16, 2008, the subject matter of which is incorporated herein by reference.

BACKGROUND OF THE INVENTION

1. Field of the Invention

The invention relates in general to a data processing method and an electronic device using the same, and more particularly to a data filtering method and an electronic device using the same.

2. Description of the Related Art

Recently, the development of the mobile technology has brought a lot of demands in the market of the handheld electronic device. For example, the handheld electronic devices, such as personal digital assistants (PDAs), smartphones and touch phones, have gradually become necessary in the daily life of the human being.

In order to achieve the object of operating the handheld electronic device, the conventional handheld electronic device is equipped with mechanical keys to be operated by the user. In addition, a handheld electronic device equipped with a sensing element is also available in the market. The sensing element includes a number of capacitive sensors. When the user places a finger on the sensing element to apply a pressure thereon, the corresponding capacitive sensors sense variations so that the positions touched by the finger are identified. Furthermore, the moving direction of the finger on the sensing element may also be identified by ways of continuous sensing. Thus, when the user is operating the handheld electronic device, he or she can move the cursor, adjust the volume or select the song by pressing on the sensing element or moving on the sensing element.

However, when this sensing element is used, the handheld electronic device may encounter the unstable problem due to the reasons being simply stated hereinbelow. Because the electronic device has complicated circuits, an interfering signal may be generated to interfere with the operation of the sensing element when the circuits are transferring signals. In addition, when the handheld electronic device is performing the communication, it is usually operated with the high power, so the interfering signal is generated intensively which may cause the sensing element sense a lot of noise. On the other hand, the device may become unstable because the electronic device may be influenced by the temperature and the humidity, or because the sensing element may sense undesired data due to the improper operation of the user. Thus, it is an important subject in the industry to enhance the operation stability of the electronic device equipped with the sensing element and thus to enhance the usability for users.

SUMMARY OF THE INVENTION

The invention is directed to a data filtering method and an electronic device using the same, in which the data identified by the electronic device can be filtered, the operation stability of the electronic device can be enhanced, and the usability for the user can be thus enhanced.

According to a first aspect of the present invention, a data filtering method is provided. The data filtering method includes the following steps. First, m pieces of data are identified at first to $m^{th}$ time points of a number of time points, wherein a datum is not identified at an $(m+1)^{th}$ time point of the time points, and m is a positive integer. Then, the identified m pieces of data are removed.

According to a second aspect of the present invention, an electronic device including an acquiring unit and a filtering unit is provided. The acquiring unit identifies data at a number of time points. The acquiring unit identifies m pieces of data at first to $m^{th}$ time points of the time points, wherein a datum is not identified at an $(m+1)^{th}$ time point of the time points, and m is a positive integer. The filtering unit removes the m pieces of data identified by the acquiring unit.

According to a third aspect of the present invention, a data filtering method is provided. The method includes the following steps. First, a first detected datum is identified at a first time point. Then, it is judged whether or not a real-time detected datum is identified every one predetermined period. If the real-time detected datum is not identified, the first detected datum will be removed.

According to a fourth aspect of the present invention, an application program stored with digital data is provided. After an electronic device loads and executes the digital data, the electronic device can perform a data filtering method for filtering data identified by the electronic device at a number of time points. The method includes the following steps. First, m pieces of data are identified at first to $m^{th}$ time points of the time points, wherein a datum is not identified at an $(m+1)^{th}$ time point of the time points, and m is a positive integer. Then, the identified m pieces of data are removed.

According to a fifth aspect of the present invention, an electronic device including a sensing module and a processor is provided. The sensing module identifies a number of pieces of data at a number of time points. The sensing module includes a memory and a microprocessor. The memory stores program code. The microprocessor filters the number of pieces of data after reading and executing the program code. If the microprocessor judges that the sensing module identified m pieces of data at first to $m^{th}$ time points of the time points, and fails in identifying a datum at an $(m+1)^{th}$ time point of the time points, the microprocessor further judges whether or not m is smaller than a predetermined value n. If m is smaller than n, the microprocessor further removes the identified m pieces of data. If m is not smaller than n, the microprocessor further outputs the identified m pieces of data. The processor receives the data filtered by the sensing module.

According to a sixth aspect of the present invention, an electronic device is provided. The electronic device filters a number of pieces of data identified at a number of time points, and executes an application program. The electronic device includes a sensing module and a processing module. The sensing module identifies the number of pieces of data at the time points. The processing module includes a memory and a processor. The memory stores a program code of an operating system. The processor reads and executes the program code of the operating system and then receives and filters the data identified by the sensing module. If the processor identifies m pieces of data at first to $m^{th}$ time points of the time points and fails in identifying a datum at an $(m+1)^{th}$ time point of the time points, then the processor further judges whether or not m is smaller than a predetermined value n. If m is smaller than n, the processor further removes the identified m pieces of data. If m is not smaller than n, the processor further executes the application program according to the filtered data.

According to a seventh aspect of the present invention, an electronic device is provided. The electronic device executes an application program to filter a number of pieces of data identified at a number of time points. The electronic device includes a memory and a processor. The memory stores program code of an operating system. The processor reads and executes the program code of the operating system, and then executes the application program. The application program enables the processor to receive and filter the data. If the processor receives m pieces of data at first to $m^{th}$ time points of the time points, and a datum is not received by the processor at an $(m+1)^{th}$ time point of the time points, the processor further judges whether or not m is smaller than a predetermined value n. If m is smaller than n, the processor further removes the identified m pieces of data.

The invention will become apparent from the following detailed description of the preferred but non-limiting embodiments. The following description is made with reference to the accompanying drawings.

DETAILED DESCRIPTION OF THE INVENTION

First Embodiment

Figure 1:
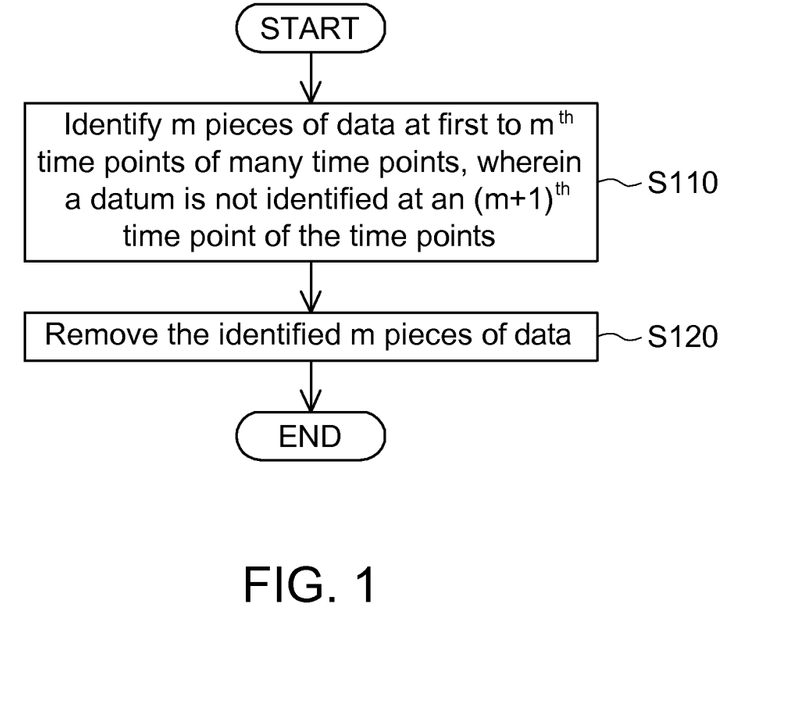
FIG. 1 is a flow chart showing a data filtering method applied to an electronic device according to a first embodiment of the invention.

The data filtering method applied to an electronic device according to the first embodiment of the invention is for filtering data identified by the electronic device at a number of time points. FIG. 1 is a flow chart showing the data filtering method applied to the electronic device according to the first embodiment of the invention. Referring to FIG. 1, the method includes the following steps. In step S110, m pieces of data are identified at first to $m^{th}$ time points of the time points, and a datum is not identified at an $(m+1)^{th}$ time point of the time points, wherein m is a positive integer. In step S120, the identified m pieces of data are removed.

Figure 2:
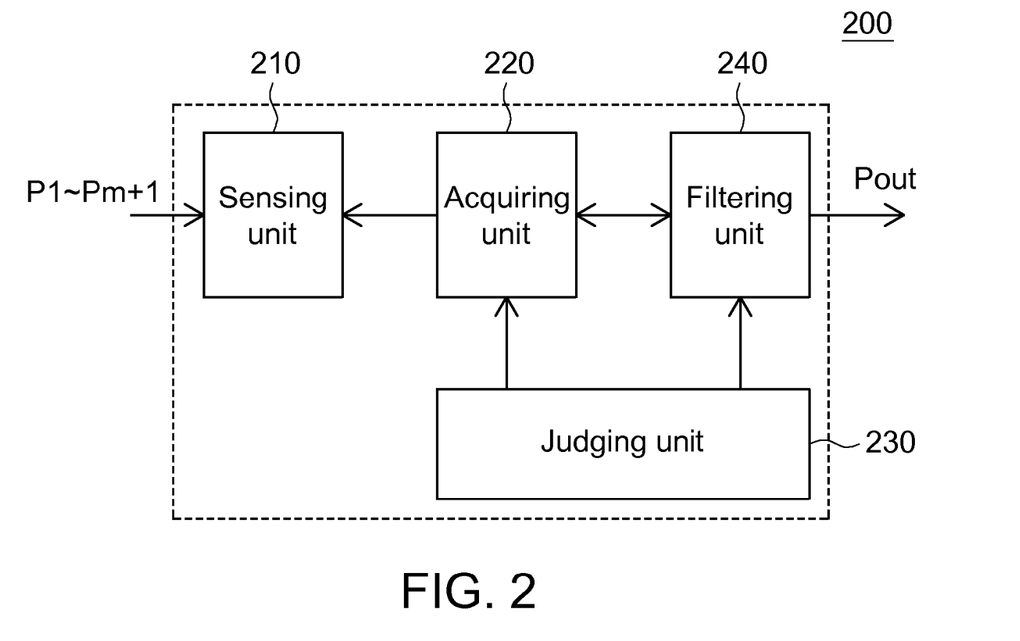
FIG. 2 is a schematic illustration showing the electronic device applying the data filtering method according to the first embodiment of the invention.

The electronic device applying the data filtering method according to the first embodiment of the invention will be described in the following. FIG. 2 is a schematic illustration showing an electronic device 200 applying the data filtering method according to the first embodiment of the invention. Referring to FIG. 2, the electronic device 200 includes a sensing unit 210, an acquiring unit 220, a judging unit 230 and a filtering unit 240. The sensing unit 210 senses a number of pieces of data P1 to Pm+1. The acquiring unit 220 identifies the data P1 to Pm+1 at the time points. The acquiring unit 220 identifies the m pieces of data P1 to Pm at the first to $m^{th}$ time points of the time points, and fails in identifying the datum Pm+1 at the $(m+1)^{th}$ time point of the time points, wherein m is a positive integer. The first to $(m+1)^{th}$ time points of the time points are preferably have equal period of time between two adjacent time points. For example, two adjacent time points are separated by a predetermined period.

The judging unit 230 judges whether or not m is smaller than a predetermined value n, wherein n is a positive integer greater than 1. If the judging unit 230 judges that m is smaller than the predetermined value n, the filtering unit 240 removes the m pieces of data P1 to Pm identified by the acquiring unit 220. On the contrary, if the judging unit 230 judges that m is not smaller than the predetermined value n, the filtering unit 240 further outputs the m pieces of data P1 to Pm identified by the acquiring unit 220, and does not remove the m pieces of data P1 to Pm. That is, if the acquiring unit 220 identifies the m pieces of data P1 to Pm wherein m is larger than n (m>n) in the electronic device 200, the filtering unit 240 outputs the data P1 to Pm as output data Pout. On the contrary, if the acquiring unit 220 identifies the m pieces of data P1 to Pm wherein m is smaller than n (m<n), the filtering unit 240 removes the data P1 to Pm, which are identified by the acquiring unit 220 and do not serve as the output data Pout.

Figure 3:
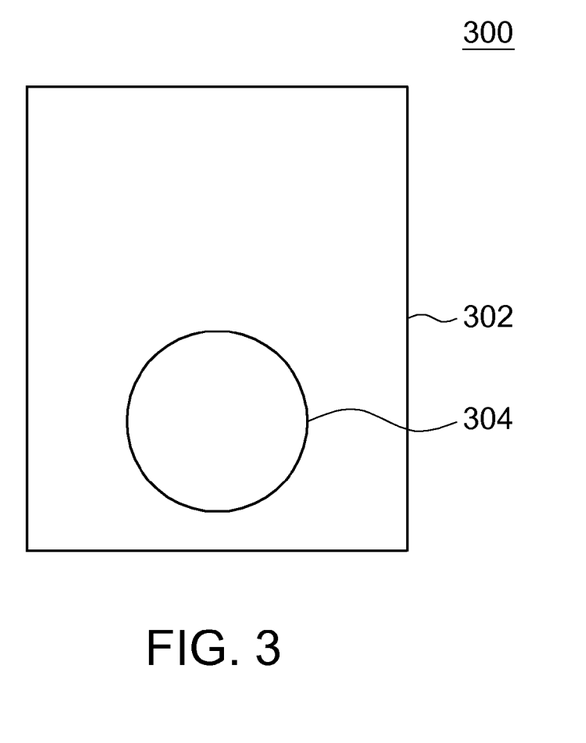
FIG. 3 is a schematic illustration showing an example of the electronic device according to the first embodiment of the invention.

More specifically, the sensing unit 210 includes a sensing wheel. FIG. 3 is a schematic illustration showing an example of an electronic device 300 according to the first embodiment of the invention. As shown in the example of FIG. 3, the electronic device 300 has a casing 302 and a sensing wheel 304. The sensing wheel 304 is, without limitation to, a capacitance sensing wheel, for example. The sensing wheel 304 includes a number of sensors enclosing a ring. Each sensor preferably corresponds to a value, or corresponds to a value being identified by transforming its position coordinates.

When the sensing wheel 304 is applied with an external force (e.g., when the user's finger slides on the sensing wheel 304), the sensors triggered by the applied external force will transmit the corresponding values. Thus, when the user's hand applies the pressure on the sensing wheel 304 (e.g., when the hand is pressing or sliding), the sensing wheel 304 sequentially senses a number of pieces of data. However, when the sensing wheel 304 is not applied with the external force but is interfered by the noise (e.g., interfered by the high-frequency signal), the sensing wheel 304 may still sense data, which can be referred to as noise data. In this embodiment, the applicant found that the sensing wheel 304 may sense the noise data randomly, i.e. the sensing wheel 304 may sense a predetermined piece of the noise data. So, it can be known that the data P1~Pm+1, which are shown in FIG. 2 and are identified by the sensing unit, may contain the noise data identified by the sensing unit due to the noise interference.

Figure 4:
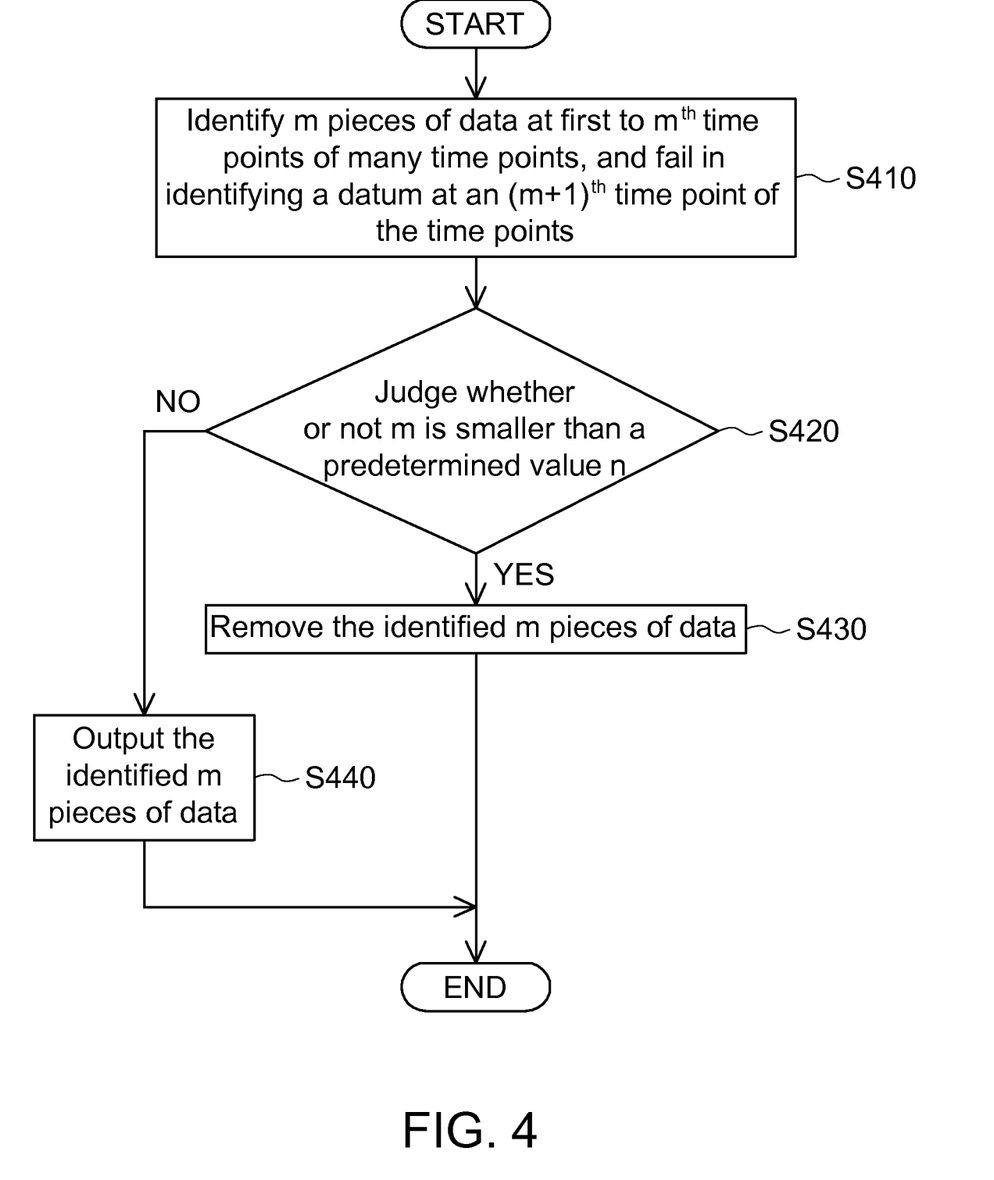
FIG. 4 is a detailed flow chart showing the data filtering method applied to the electronic device according to the first embodiment of the invention.

After the sensing unit 210 identifies the pieces of data P1 to Pm+1, how the electronic device according to the embodiment of the invention performs the data filtering method will be described with reference to a detailed flow chart in conjunction with a number of examples. FIG. 4 is a detailed flow chart showing the data filtering method applied to the electronic device according to the first embodiment of the invention. Referring to FIG. 4, the data filtering method includes the following steps. In step S410, m pieces of data are identified at first to $m^{th}$ time points of the time points, and a datum is not identified at an $(m+1)^{th}$ time point of the time points, wherein m is a positive integer. In step S420, it is judged whether or not m is smaller than a predetermined value n, wherein n is a positive integer greater than 1. If yes, step S430 is performed to remove the identified m pieces of data; and if not, step S440 is performed to output the identified m pieces of data.

Figure 5A:
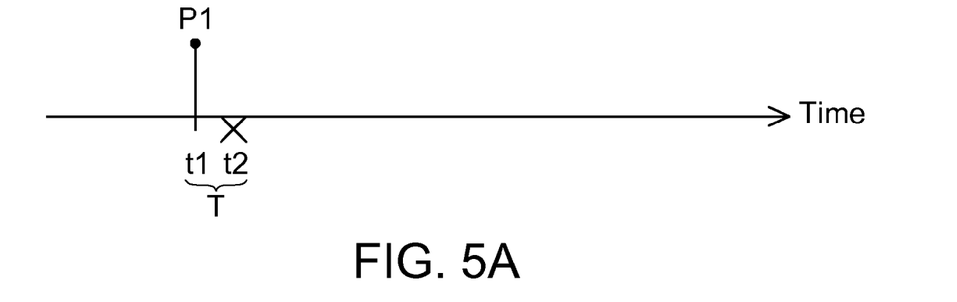
FIGS. 5A to 5D are schematic illustrations showing an example, in which a sensing unit senses corresponding data at a number of time points in practice.

How the electronic device of this embodiment performs the data filtering method will be described with reference to several examples. FIGS. 5A to 5D are schematic illustrations showing an example, in which a sensing unit senses corresponding data at a number of time points in practice. In FIGS. 5A to 5D, the time points have equal period of time between two adjacent time points. That is, two adjacent time points are separated by a predetermined period T. The symbol "x" is provided to represent that the acquiring unit fails in identifying a datum at a corresponding time point. Furthermore, in these examples, n is equal to 4 and m is illustrated in different values. In FIG. 5A, m is equal to 1. In this example, the acquiring unit identifies a first datum P1 at a first time point t1, and fails in identifying a datum at a second time point. Because m is smaller than n (i.e., 1<4), the filtering unit removes the first datum P1.

Figure 5B:
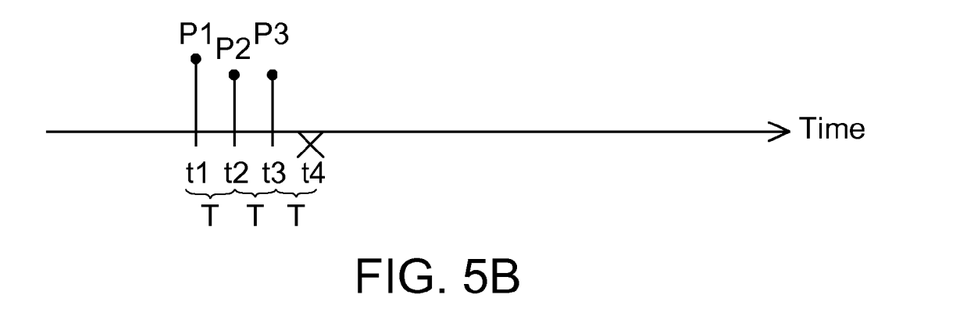

In FIG. 5B, m is equal to 3. In this example, the acquiring unit identifies corresponding pieces of data P1 to P3 at first to third time points t1 to t3. That is, the acquiring unit identifies three pieces of data P1 to P3 at the first to third time points t1 to t3, respectively. In addition, the acquiring unit fails in identifying a datum at a fourth time point. Because m is smaller than n (i.e., 3<4), the filtering unit removes the first to third data P1 to P3.

Figure 5C:
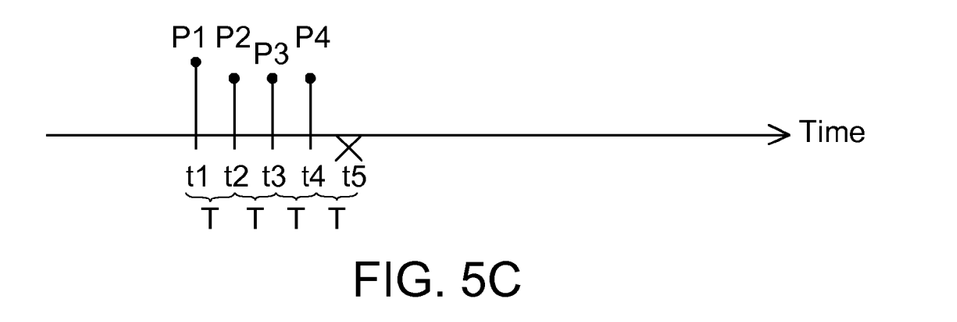

In FIG. 5C, m is equal to 4. In this example, the acquiring unit identifies corresponding pieces of data P1 to P4 at first to fourth time points t1 to t4. That is, the acquiring unit identifies four pieces of data P1 to P4 at the first to fourth time points t1 to t4, respectively. In addition, the acquiring unit fails in identifying a datum at a fifth time point t5. Next, it is judged whether or not m is smaller than n. In other words, it is judged whether or not m is greater than n. Because m is equal to n (i.e., 4=4), the filtering unit does not remove the first to fourth data P1 to P4, and outputs the data P1 to P4 as the output data Pout.

Figure 5D:
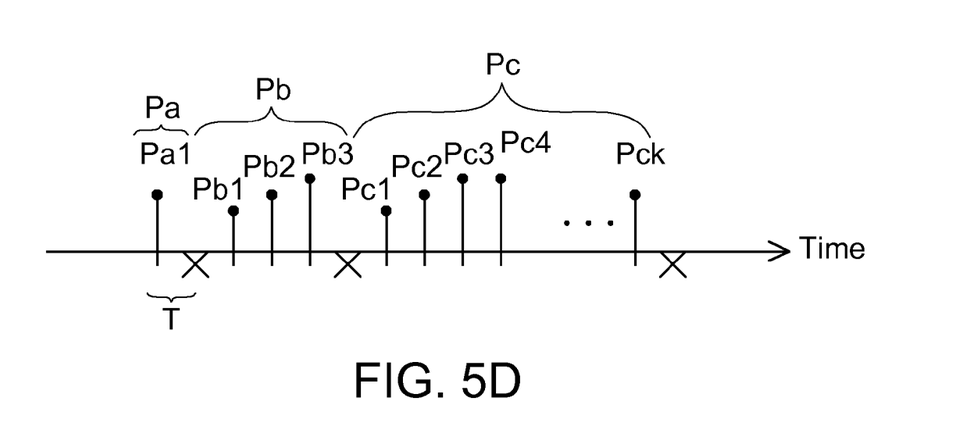

In the example of FIG. 5D, the acquiring unit identifies many groups of data sensed by the sensing unit. The groups of data include a first group of data Pa, a second group of data Pb and a third group of data Pc, wherein the data have different values m. In the first group of data Pa, m=1, which means that the first group of data Pa includes the first datum Pa1. In the second group of data Pb, m=3, which means that the second group of data Pb includes first to third data Pb1 to Pb3. In the third group of data Pc, m=k, and k is an integer greater than 4 (k>4=n), which means that the third group of data Pc includes first to $k^{th}$ data Pc1 to Pck. In this example, similar to the example of FIG. 5A, the filtering unit removes the first detected datum Pa1 of the first group of detected data Pa. Next, similar to the example of FIG. 5B, the filtering unit removes the first to third detected data Pb1 to Pb3 of the second group of detected data Pb. Similar to the example of FIG. 5C, the filtering unit does not remove the data Pc1 to Pck of the third group of data Pc, and outputs the data Pc1 to Pck as the output data Pout.

According to the examples of FIGS. 5A to 5D, it can be known that the electronic device can perform the data filtering method to filter the data sensed by the sensing unit and identified by the acquiring unit at a number of time points. More particularly, as shown in the example of FIG. 5D, the electronic device can remove the data of the first and second groups of data Pa and Pb, and outputs the third group of data Pc as the output data Pout so that the data can be filtered.

The data filtering method and the electronic device using the same according to the embodiment of the invention can filter the identified data, and remove the undesired data so that the object of filtering the data can be achieved. Thus, the embodiment can prevent the electronic device from performing the redundant operations according to the data identified due to noise interference, so that the power consumption can be reduced, and the stability of the system can be enhanced.

Second Embodiment

Figure 6:
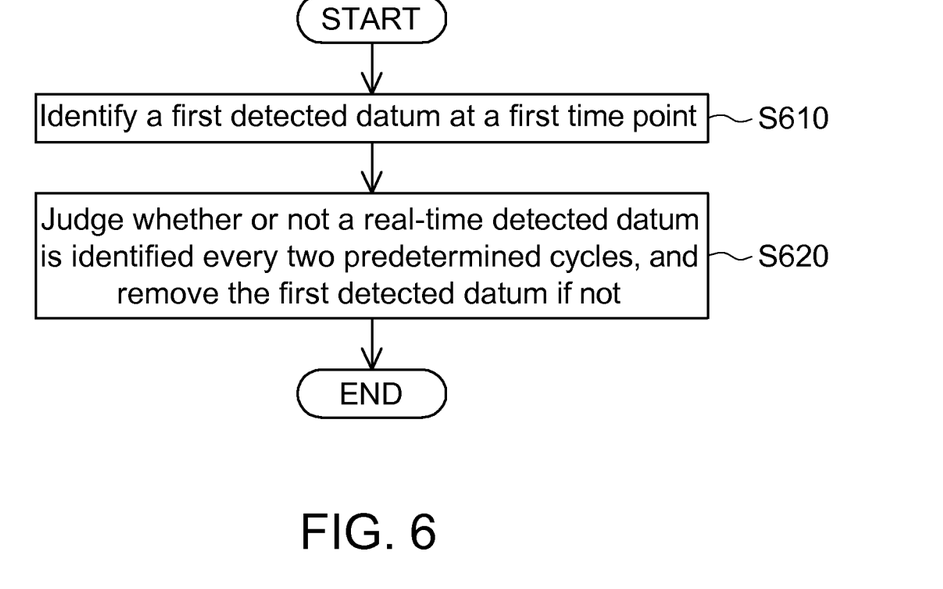
FIG. 6 is a flow chart showing a data filtering method applied to an electronic device according to a second embodiment of the invention.

The data filtering method applied to an electronic device according to the second embodiment of the invention is for filtering detected data identified by the electronic device. FIG. 6 is a flow chart showing the data filtering method applied to the electronic device according to the second embodiment of the invention. Referring to FIG. 6, the data filtering method includes the following steps. In step S610, a first detected datum is identified at a first time point. In step S620, it is judged whether or not a real-time detected datum is identified every one predetermined period. If not, the first detected datum is removed.

Figure 7:
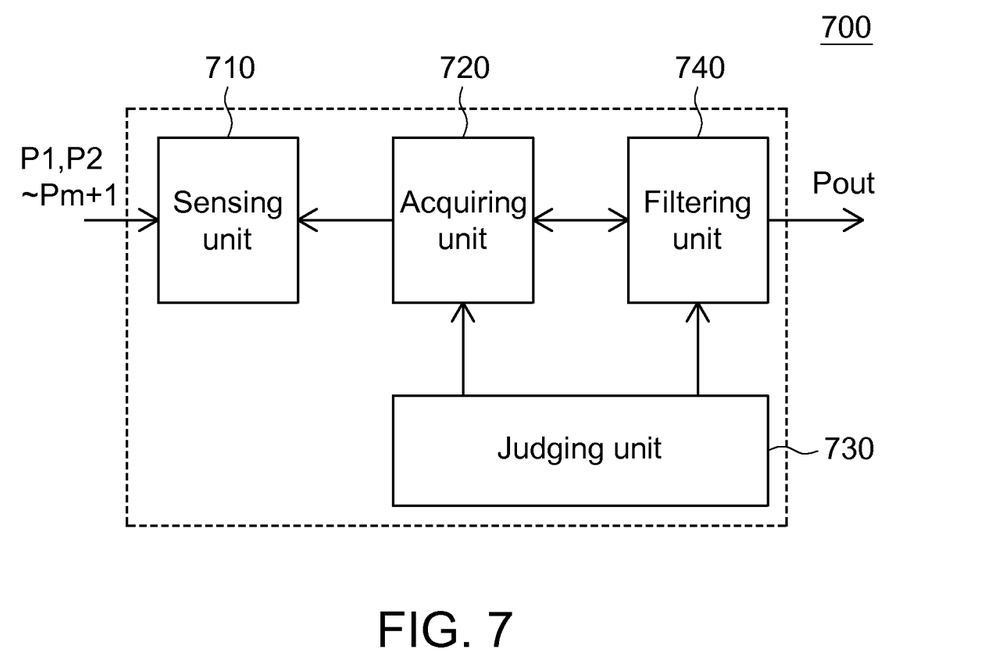
FIG. 7 is a schematic illustration showing the electronic device applying the data filtering method according to the second embodiment of the invention.

The electronic device applying the data filtering method according to this embodiment will be described in the following. FIG. 7 is a schematic illustration showing an electronic device 700 applying the data filtering method according to the second embodiment of the invention. Referring to FIG. 7, the electronic device 700 includes a sensing unit 710, an acquiring unit 720, a judging unit 730 and a filtering unit 740. The sensing unit 710 senses a first detected datum P1 and a real-time detected datum. The acquiring unit 720 identifies the first detected datum P1 at a first time point, and identifies the real-time detected datum every one predetermined period. The judging unit 730 judges whether or not the acquiring unit 720 identifies the real-time detected datum every the one predetermined period. If not, the filtering unit 740 removes the first detected datum P1.

For example, the real-time detected datum includes a second detected datum corresponding to a second time point, wherein the second time point and the first time point are separated by a predetermined period. If the judging unit 730 judges that the acquiring unit 720 fails in identifying the second detected datum P2 at the second time point, the filtering unit 740 removes the first detected datum P1.

For example, the real-time detected datum includes second to $(m+1)^{th}$ detected data P2 to Pm+1 corresponding to second to $(m+1)^{th}$ time points, wherein m is a positive integer greater than 1, and every two adjacent time points are separated by the predetermined period. In this example, the acquiring unit 720 identifies the second to $m^{th}$ detected data P2 to Pm at the second to $m^{th}$ time points, respectively, and fails in identifying the $(m+1)^{th}$ detected data Pm+1 at the $(m+1)^{th}$ time point. Next, the judging unit 730 judges whether or not m is smaller than a predetermined value n, wherein n is preferably a positive integer greater than 1. If m is smaller than n, the filtering unit 740 removes the first to $m^{th}$ detected data P1 to Pm. On the contrary, if m is not smaller than n, the filtering unit 740 outputs the first to $m^{th}$ detected data P1 to Pm. That is, similar to the electronic device 200 of the first embodiment, the filtering unit 740 outputs the data P1 to Pm as the output data Pout in the electronic device 700 of this embodiment if the acquiring unit 720 identifies the m pieces of data P1 to Pm wherein m is larger than n (m>n). On the contrary, the filtering unit 740 removes the data P1 to Pm, which are identified by the acquiring unit 720 and do not serve as the output data Pout if the acquiring unit 720 identifies the m pieces of data P1 to Pm wherein m is smaller than n (m<n).

The sensing unit 710 of this embodiment includes a sensing wheel, wherein the function and operation principle thereof have been specified in the first embodiment, and detailed descriptions thereof will be thus omitted.

Figure 8:
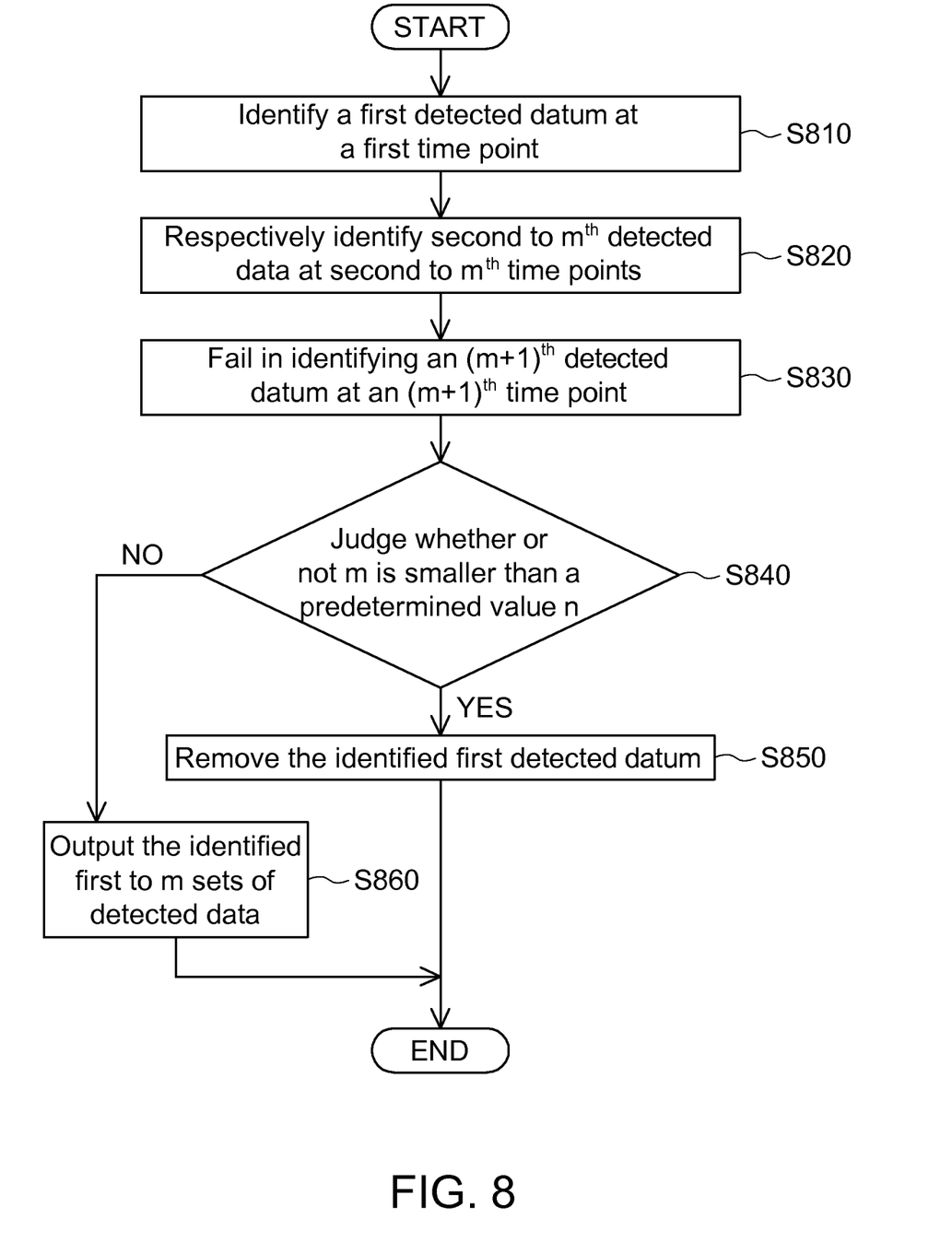
FIG. 8 is a detailed flow chart showing the data filtering method executed by the electronic device according to the second embodiment of the invention.

In addition, how the electronic device of this embodiment performs the data filtering method will be described in the following detailed flow chart in conjunction with several examples. FIG. 8 is a detailed flow chart showing the data filtering method executed by the electronic device according to the second embodiment of the invention. Referring to FIG. 8, the method includes the following steps. In step S810, a first detected datum is identified at a first time point. In step S820, second to $(m+1)^{th}$ detected data are respectively identified at second to $(m+1)^{th}$ time points, wherein m is a positive integer. In step S830, an $(m+2)^{th}$ detected datum is not identified at an $(m+2)^{th}$ time point. In step S840, it is judged whether or not m is smaller than a predetermined value n. If yes, step S850 is performed to remove the identified first detected datum. If not, step S860 is preformed to output the identified first to $m^{th}$ pieces of data.

As shown in FIGS. 5B and 5D, what is different from the first embodiment is that the filtering unit removes the first detected datum P1 in FIG. 5B. In FIG. 5D, the filtering unit removes the first detected data Pa1 and Pb1 of the first and second groups of data Pa and Pb.

Thus, the electronic device can perform the data filtering method to filter the data sensed by the sensing unit and identified by the acquiring unit at the time points. More particularly, as shown in the example of FIG. 5D, the electronic device can filter the data by removing the first piece of data Pa1 and Pb1 of the first and second groups of data Pa and Pb, and can output other unremoved data of the groups of data Pb and Pc to serve as the output data Pout so that the object of filtering the data can be achieved.

In the detailed flow chart of FIG. 8, the identified first data may be removed because the applicant found that the first piece of data sensed by the sensing unit is usually the data identified by the sensing unit due to the noise interference. Thus, this embodiment removes the data, which is identified most possibly due to the noise interference, to enhance the correctness of filtering data. However, the invention is not limited thereto. In other applications, it is also possible to remove the identified first to $m^{th}$ pieces of data. Any method is still deemed as falling within the scope of the invention as long as the data are filtered after judging that whether or not the number of pieces of identified data is smaller than a predetermined value, and under the precondition that the electronic device still can be normally and stably executed according to the user's operation.

In addition, the acquiring unit can identify the data according to various methods. For example, in the first embodiment, the acquiring unit identifies the data corresponding to the time points in an interrupting manner and in a polling manner. Also, in the second embodiment, the first detected data and the real-time detected data may be identified in the interrupting manner or the polling manner. Preferably, the acquiring unit identifies the first detected data in the interrupting manner, and then the acquiring unit periodically identifies the realtime detected data in the polling manner. However, the invention is also not limited thereto.

Figure 9:
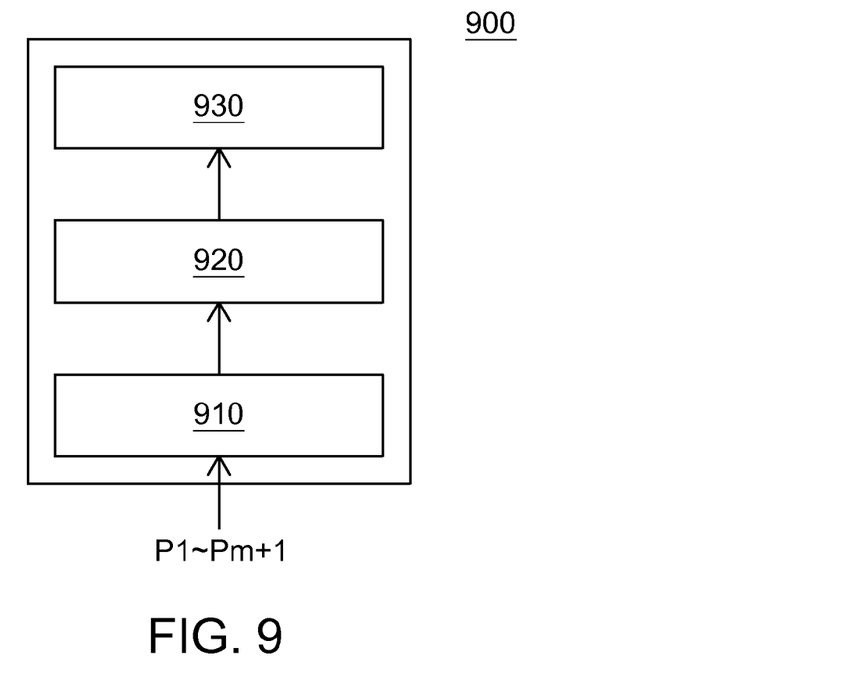
FIG. 9 is a block diagram showing an electronic device applying the data filtering method of the invention.

The invention further provides an electronic device for performing the data filtering method. The data filtering method includes the steps specified in the first embodiment, so detailed descriptions thereof will be omitted. FIG. 9 is a block diagram showing an electronic device 900 applying the data filtering method of the invention. Referring to FIG. 9, the electronic device 900 includes an input layer 910, a driving layer 920 and an application layer 930. The input layer 910 identifies a number of pieces of data P1 to Pm+1 at a number of time points. The driving layer 920 receives the data P1 to Pm+1 and executes an operating system. The application layer 930 executes an application program under the control of the driving layer 920. The data filtering method of the invention may be implemented in one of the input layer 910, the driving layer 920, and the application layer 930. How the data filtering method is implemented in the electronic device will be described in the following with reference to several embodiments.

Third Embodiment

As shown in FIG. 9, the data filtering method is implemented in the input layer 910 of FIG. 9 in this embodiment. The input layer 910 is a sensing module having a microprocessor and a memory. The sensing module executes the data filtering method of the invention via the microprocessor, and the driving layer 920 includes a processor.

Figure 10:
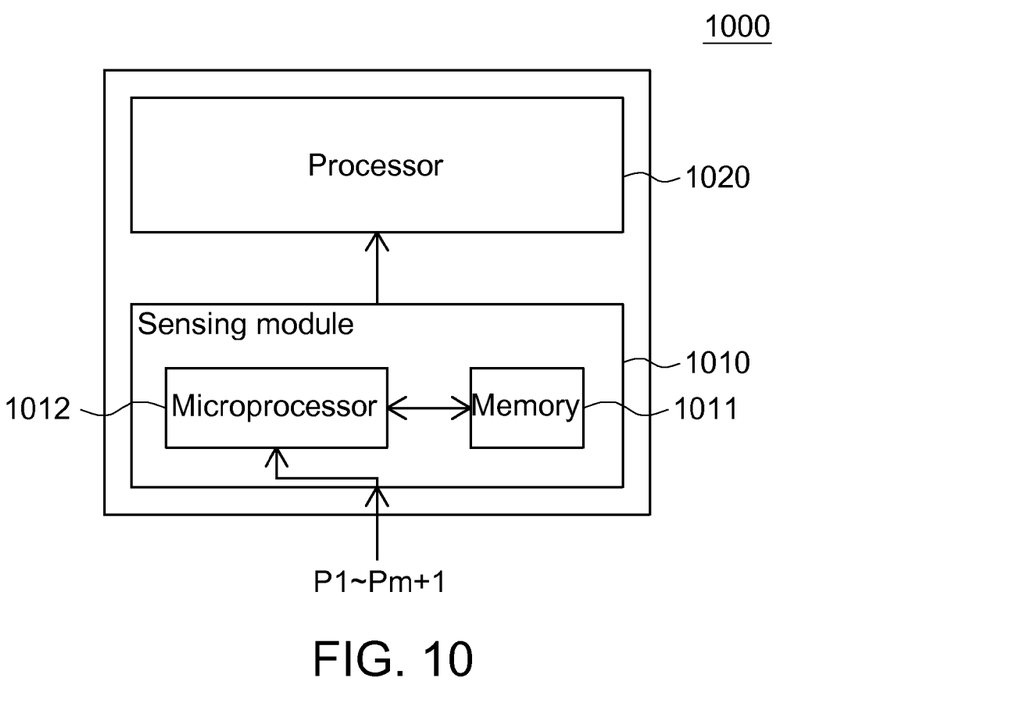
FIG. 10 is a schematic illustration showing an electronic device according to a third embodiment of the invention.

FIG. 10 is a schematic illustration showing an electronic device 1000 according to the third embodiment of the invention. Referring to FIG. 10, the electronic device 1000 includes a sensing module 1010 and a processor 1020. The sensing module 1010 identifies a number of pieces of data P1 to Pm+1 at a number of time points. The sensing module 1010 includes a memory 1011 and a microprocessor 1012. The memory 1011 stores a program code. The microprocessor 1012 reads and executes the program code, and then filters the pieces of data P1 to Pm+1. If the microprocessor 1012 judges that the sensing module 1010 identifies the m pieces of data P1 to Pm at first to $m^{th}$ time points of the time points, and fails in identifying the datum Pm+1 at an $(m+1)^{th}$ time point of the time points, the microprocessor 1012 further judges whether or not m is smaller than a predetermined value n. If yes, the microprocessor 1012 removes the identified m pieces of data P1 to Pm. If not, the microprocessor 1012 further outputs the identified m pieces of data P1 to Pm. The processor 1020 receives the data filtered by the sensing module 1010. The processor 1020 may be a high-level microcontroller, and the microprocessor 1012 may be a low-level microcontroller.

In this embodiment, the data filtering method is implemented in the sensing module for identifying external data. After the sensing module identifies the data, it can filter the data without transferring the data to another unit, such as the driving layer 920. Thus, this embodiment has the higher efficiency in processing the data, and is advantageous to the real-time processing. Furthermore, the data cannot be transmitted to the driving layer 920 before being filtered. So, the power-saving effect can be achieved because it is possible to prevent the data, which may be identified due to the noise and have to be removed, from being transmitted.

Fourth Embodiment

As shown in FIG. 9, the data filtering method is implemented in the driving layer 920 in this embodiment. The input layer 910 is a sensing module, and the driving layer 920 is a processing module for executing the operating system and thus performing the data filtering method of the invention.

Figure 11:
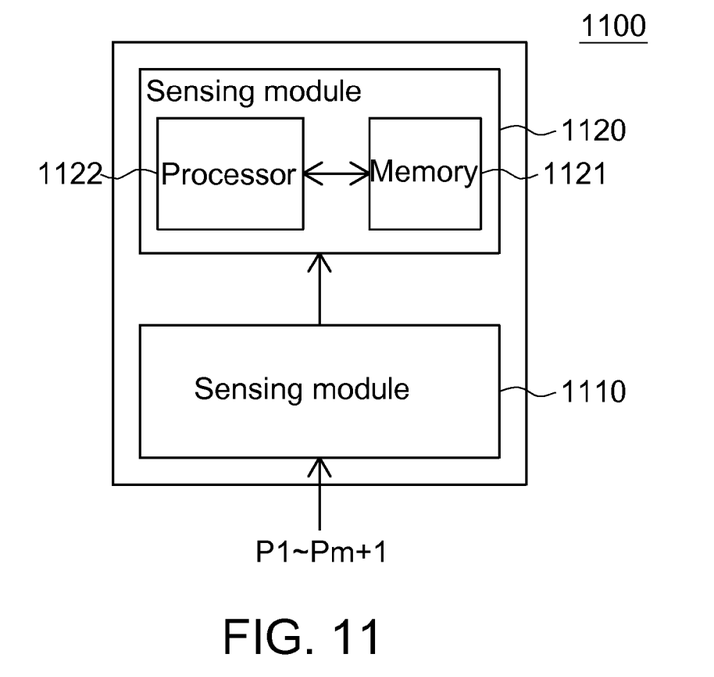
FIG. 11 is a schematic illustration showing an electronic device according to a fourth embodiment of the invention.

FIG. 11 is a schematic illustration showing an electronic device 1100 according to the fourth embodiment of the invention. As shown in FIG. 11, the electronic device 1100 is for filtering a number of pieces of data P1 to Pm+1 identified at a number of time points, and for executing an application program. The electronic device 1100 includes a sensing module 1110 and a processing module 1120. The sensing module 1110 identifies the number of pieces of data P1 to Pm+1 at the time points. The processing module 1120 includes a memory 1121 and a processor 1122. The memory 1121 stores a program code of an operating system. The processor 1122 reads and executes the program code of the operating system, and then receives and filters the data P1 to Pm+1 identified by the sensing module 1110. If the processor 1122 identifies the m pieces of data P1 to Pm at first to $m^{th}$ time points of the time points, and fails in identifying the datum Pm+1 at an $(m+1)^{th}$ time point of the time points, the processor 1122 further judges whether or not m is smaller than a predetermined value n. If yes, the processor 1122 further removes the identified m pieces of data P1 to Pm. If not, the processor 1122 further executes the application program according to the filtered data P1 to Pm.

In this embodiment, what is different from the third embodiment is that the input layer 910 does not use a processor. Thus, the number of elements for the electronic device can be decreased and the cost can be lowered.

Fifth Embodiment

As shown in FIG. 9, the data filtering method is implemented in the application layer 930 in this embodiment. The driving layer 920 includes a processor and a memory. The application layer 930 is an application program. When the processor executes the application program, the data filtering method of the invention can be performed.

Figure 12:
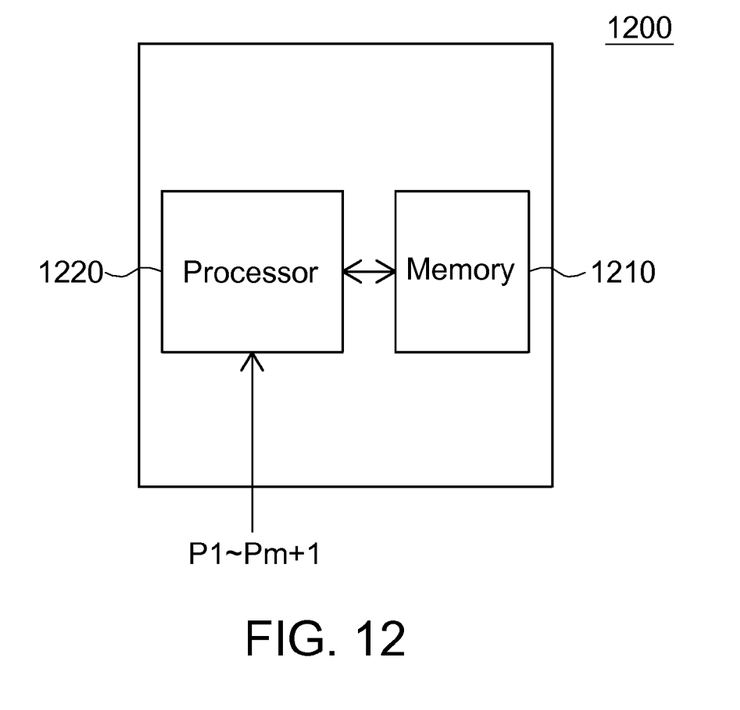
FIG. 12 is a schematic illustration showing an electronic device according to a fifth embodiment of the invention.

FIG. 12 is a schematic illustration showing an electronic device 1200 according to a fifth embodiment of the invention. As shown in FIG. 12, the electronic device 1200 executes the application program to filter a number of pieces of data P1 to Pm+1 identified at a number of time points. The electronic device 1200 includes a memory 1210 and a processor 1220. The memory 1210 stores a program code of an operating system. The processor 1220 reads and executes the program code of the operating system, and then executes the application program. The application program enables the processor 1220 to receive and filter the data P1 to Pm+1. If the processor 1220 receives the m pieces of data P1 to Pm at first to $m^{th}$ time points of the time points, and fails in receiving the datum Pm+1 at an $(m+1)^{th}$ time point of the time points, the processor 1220 further judges whether or not m is smaller than a predetermined value n. If yes, the processor 1220 removes the identified m pieces of data P1 to Pm.

In this embodiment, the data filtering method of the invention is performed when the processor executes a specific application program. Thus, what is different from the third and fourth embodiments is that the electronic device of this embodiment can determine whether or not the data filtering method has to be performed according to different requirements for the application programs. So, the electronic device of this embodiment has the higher flexibility of design for the designer.

The electronic device according to the embodiment of the invention is preferably a handheld electronic device, and the sensing unit includes a sensing wheel. The sensing wheel sequentially senses the data inputted by the user so that the handheld electronic device can be operated. For example, the sensing wheel can sense the position touched by the user's finger, or sense the sliding direction of the finger, such as the clockwise or counterclockwise direction, on the wheel. By pressing the sensing wheel or sliding on the sensing wheel, the cursor can be moved, the volume can be adjusted, or the song can be selected so that the handheld electronic device can be operated. The sensing wheel is, without limitation to, a capacitance sensing wheel, for example. Any sensing unit capable of sequentially identifying the data inputted by the user may be applied to the electronic device of the invention.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data filtering method for filtering data generated by a sensing unit of an electronic device, the method comprising the steps of:
   (a) identifying m pieces of data by continuously acquiring, by an acquiring unit of the electronic device, the m pieces of data at first to $m^{th}$ time points, and failing in identifying an (m+1)th datum at an (m+1)th time point, wherein m is a positive integer;
   (b) judging, by a judging unit of the electronic device, whether or not m is smaller than a predetermined value n, wherein n is a positive integer greater than 1;
   (c) outputting, by a filtering unit of the electronic device, the identified m pieces of data if m is not smaller than the predetermined value n, and removing the identified m pieces of data at the first to the $m^{th}$ time points if m is smaller than the predetermined value n.

2. The method according to claim 1, wherein the first to $(m+1)^{th}$ time points have equal period of time between two adjacent time points.

3. An electronic device, comprising:
   a sensing unit for generating a plurality of data;
   an acquiring unit for identifying m pieces of data by continuously acquiring the m pieces of data from the sensing unit at first to $m^{th}$ time points, and failing in identifying an (m+1)th datum at an (m+1)th time point, wherein m is a positive integer;
   a judging unit, for judging whether or not m is smaller than a predetermined value n, wherein n is a positive integer greater than 1; and
   a filtering unit, for outputting the identified m pieces of data if m is not smaller than the predetermined value n;
   wherein, the filtering unit removes a first piece of datum among the identified m pieces of data if m is smaller than the predetermined value n.

4. The device according to claim 3, wherein the first to $(m+1)^{th}$ time points have equal period of time between two adjacent time points.

5. The device according to claim 3, wherein the sensing unit comprises a sensing wheel.

* * * * *